United States Patent [19]
Olivieri

[11] 4,413,503
[45] Nov. 8, 1983

[54] METHOD OF DETECTING LEAKS IN A LARGE STORAGE TANK

[75] Inventor: Edgar S. Olivieri, Summit Hills, P.R.

[73] Assignee: Texaco Puerto Rico Inc., San Juan, P.R.

[21] Appl. No.: 365,752

[22] Filed: Apr. 5, 1982

[51] Int. Cl.³ .............................................. G01M 3/20
[52] U.S. Cl. ...................................... 73/40.7; 73/49.2
[58] Field of Search ........................ 73/40.7, 49.2, 49.3

[56] References Cited

U.S. PATENT DOCUMENTS

| | | | |
|---|---|---|---|
| 2,460,054 | 1/1949 | Wiggins | 73/40.5 R |
| 2,924,352 | 2/1960 | Santner et al. | 73/49.2 |
| 3,280,619 | 10/1966 | Spies | 73/40.7 |
| 3,875,499 | 4/1974 | Roberts | 73/40.7 |
| 3,902,356 | 2/1975 | Rupf-Bolz | 73/49.2 |

*Primary Examiner*—Anthony V. Ciarante
*Assistant Examiner*—Hezron Williams
*Attorney, Agent, or Firm*—Carl G. Ries; Robert A. Kulason; Henry C. Dearborn

[57] ABSTRACT

A method of testing bottoms of large storage tanks. It involves sealing the outer edges of the bottom plate against gas leakage, followed by feeding a halogen gas to the under side of the bottom plate. Then the top of the bottom plate inside the tank is scanned manually, using a hand-held halogen detector in order to detect any leaks.

8 Claims, 3 Drawing Figures

[4,413,503]

METHOD OF DETECTING LEAKS IN A LARGE STORAGE TANK

BACKGROUND OF THE INVENTION

1. Field of the Invention

This invention concerns testing of storage tanks in general. More specifically, it relates to testing of tank bottoms for large sized storage tanks.

2. Description of the Prior Art

Heretofore, a difficult task faced by operating personal in the handling and maintenance of large storage tanks has been that of testing tank bottom plates in order to locate leaks therein. Of course, a specially bad leak has been easily found, particularly if it is the result of a broken weld or a large pit in the bottom plate. However, the less obvious leak has always involved a time consuming and difficult task. Furthermore, even when a leak had been found and repaired, there was no assurance that it was properly repaired, or that no further leaks or pinholes existed.

Past methods which have been developed, have employed such techniques as use of a vacuum box, a magnaflux procedure, soap bubbles, and other such techniques for assisting in location of a leak in the bottom plate of a large storage tank. However, such procedures and/or methods have been found to be time consuming and expensive.

Consequently, it is an object of this invention to provide a method of detecting leaks in bottom plate of a large storage tank, which method is quite simple and very effective as well as not very time consuming.

SUMMARY OF THE INVENTION

Briefly, the invention concerns a method of detecting leaks in bottom plate of a large storage tank, having said bottom plate resting on a foundation. It comprises the steps of sealing the periphery of said bottom plate at said foundation against gas leakage, and introducing a detectable gas between said bottom plate and said foundation. It also comprises scanning said bottom plate with a detector of said gas in order to locate any leaks therein.

Again, briefly, the invention concerns a method of detecting leaks in bottom plate of a large storage tank having said bottom plate resting on a foundation. The method comprises the steps of applying an asphalt seal to the periphery of said bottom plate at said foundation against gas leakage from under said bottom plate at the edges thereof, and installing a gas-tight union on the inside of said bottom plate. It also comprises drilling a hole through said bottom plate inside said union, and coupling a pressurized tank of fluorinated hydrocarbon to said union for feeding said fluorinated hydrocarbon in gaseous form through said hole to the underside of said bottom plate. It also comprises scanning the upper side of said bottom plate by manually moving a halogen detector over said bottom plate inside said large storage tank.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENT

In large storage tanks, a particularly troublesome and difficult procedure has been that for testing the tank bottom to determine whether there are any leaks, either originally or which have developed after use of the tank. One troublesome aspect is that even when a leak has been found and repaired, there is no assurance that it was properly repaired, or that there are no further leaks or pinholes in the tank bottom. And, under today's conditions, it is of extreme importance to avoid any leakage from storage tanks because of the strict environmental concerns and regulations.

Storage tanks of this type are normally supported in one of three different manners. For example, the tank may be mounted on a concrete ring, or it may be mounted on a solid concrete slab, or it may be mounted directly on the earth over a crushed stone pad or the like, for support thereof. Any of these supports leave a relatively porous space between the outside of the bottom plate and the supporting surface on which the bottom of a large storage tank rests.

For the foregoing reason, the bottom plate of such a large storage tank may be isolated, insofar as a gas lying in the porous space underneath is concerned. Such isolation may be accomplished if the outer edges, or periphery of such bottom plate is sealed to prevent any gas escape thereat.

It may be noted that in referring to bottom plate of a storage tank of this type, the tank is of such size that the bottom plate will be made up of numerous sections which are welded or otherwise fastened together, to make up a singular bottom plate structure. And, it has been discovered that because of the type structure as indicated above, a method for detecting leaks through the bottom plate in accordance with this invention, may be employed. The method makes use of the ability to introduce a detectable gas underneath the bottom plate, between it and the support therefor with a seal at the outer periphery to ensure that such detectable gas remains in the porous space indicated. Then, by employing a detector of the gas which has been introduced, the presence of any leak or leaks may be readily detected by scanning the surface above the bottom plate.

Figure 1:
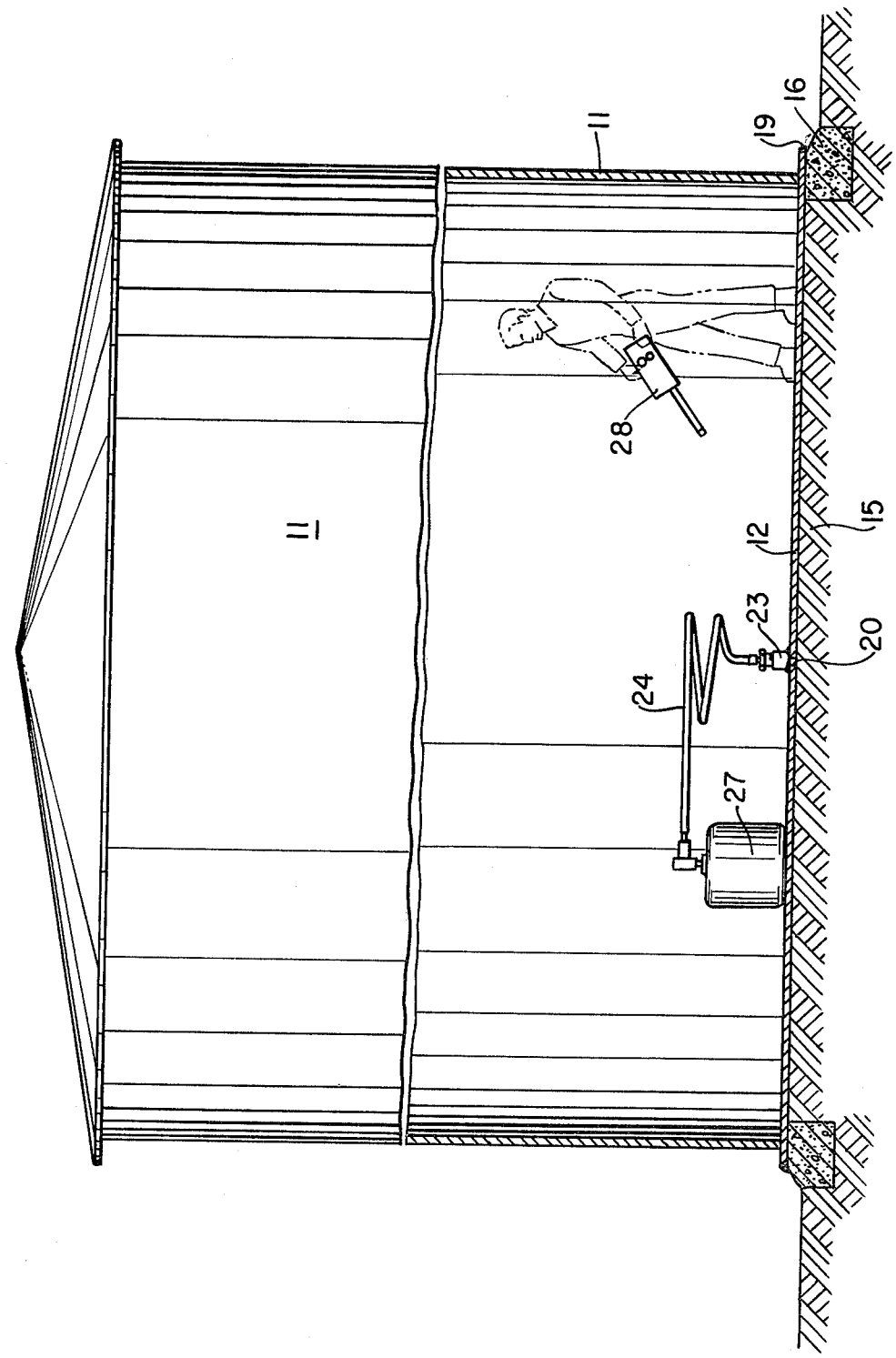
FIG. 1 is a schematic elevational showing partly in cross-section and illustrating a storage tank plus other elements that are involved in a method according to the invention.
Figure 2:
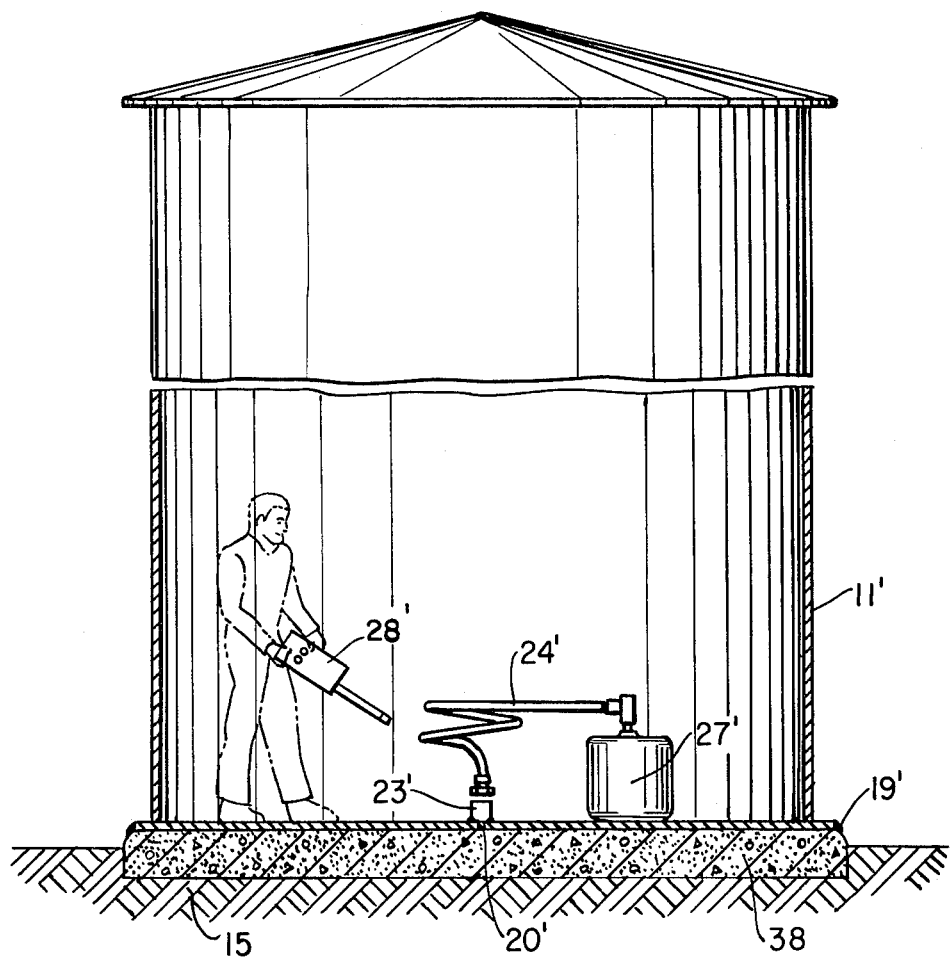
FIG. 2 is a similar showing partly broken away in cross-section and illustrating a similar storage tank with a different type of foundation therefore.

A method according to the invention may be described in connection with the drawings wherein each of FIGS. 1 and 2 illustrate a large storage tank of similar nature. The elements which are in general the same will have the same reference numerals applied but with prime marks added for the FIG. 2 modification.

With reference to FIG. 1, elements that are involved in a method according to the invention are illustrated by way of example. Thus, there is shown a large storage tank 11 which has bottom plate 12 that rests on a foundation 15. It will be understood that plate 12 is constructed to be a singular unitary element. However, it is for practical reasons made up of sections (not shown)

that are welded or otherwise fastened together to make up the entire bottom plate structure 12. The foundation 15 may be a properly prepared ground surface, e.g., a crushed stone pad and if desired there may be a concrete ring 16 to provide additional vertical support at the walls of the tank 11.

Basically, the method is quite simple and inexpensive and may be broadly described in terms of the following steps. One, sealing the periphery of the bottom plate 12 at the foundation in order to prevent any gas leakage from underneath at its edges. Thus, as indicated in the drawings there is an asphaltic material or other appropriate seal 19, applied around the outer periphery of bottom plate 12.

Two, a detectable gas is introduced between the bottom plate 12 and the foundation 15, or other base such as a concrete slab 38 which is indicated in FIG. 2. The gas introduction may be carried out in any feasible manner. For example, it is quite easy and satisfactory to drill a hole 20 through the bottom plate 12 and provide it with a fitting 23 for attaching a flexible hose 24 which is coupled to a pressurized tank 27 which contains a detectable gas, e.g., a fluorinated hydrocarbon.

Three, after the fluorinated hydrocarbon has been introduced under the bottom plate 12, the detection for any leaks is carried out by scanning the upper surface of the bottom plate 12 with a gas detector 28. As indicated, the detector 28 may be handled manually for the scanning operation. While the detectable gas and detector employed might take various forms, it is preferred to employ a fluorinated hydrocarbon as the gas and to use a halogen detector, for example, a detector manufactured by TIF Instruments, Inc., 3661 Northwest 74th Street, Miami, Florida 33147. Such a detector is designated as a TIF 5000-automatic halogen leak detector.

It will be appreciated that some precautions should be taken in carrying out the method, such as the need to ventilate the inside of the tank 11 with fresh air. Of course, if forced-feed air masks are used by personnel carrying out the scanning operation, the ventilation may not be necessary. It may be noted that the halogen gas employed is preferably that known by the trademark Freon which is a non-toxic, non-corrosive, non-flammable gas and will not affect the personnel in small concentrations.

It may be noted that a detector according to the foregoing indication is capable of detecting any combination of halogen gases, such as ethylene oxide, chlorine, fluorine, bromine, or any gas containing such gases, and any type of refrigerant.

Figure 3:
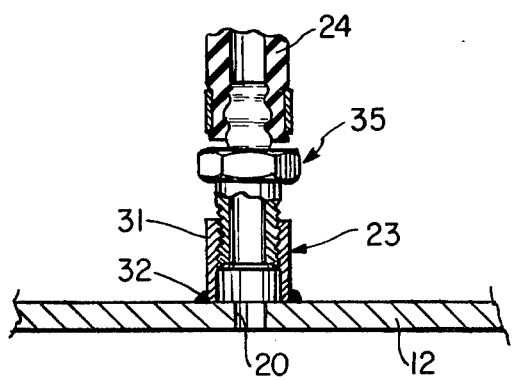
FIG. 3 is an enlarged detail, largely in cross-section and illustrating elements used in coupling a source of gas to the underside of a tank bottom.

FIG. 3 is an enlarged detail showing a structure for the fitting 23. Using this structure, a preferable procedure for feeding the gas through the hole 20 may be carried out using the structure shown in FIG. 3. Thus, there is a gas-tight union 31 which may be a simple pipe nipple. It is welded at the base thereof to the bottom plate 12, as indicated by a weld 32. Then, a drill (not shown) may be used inside of the nipple or union 31 to drill the hole 20 through the bottom plate 12. Thereafter, a conventional type coupling 35 may be attached to the union 31 so as to connect the flexible hose 24 with the hole 20.

As indicated above, FIG. 2 illustrates the same basic tank structure so that the same reference numerals are applied (with prime marks added) to the elements which are also shown in FIG. 1. However, in FIG. 2 the foundation or base for the tank 11' upon which the bottom plate 12' rests, is in this case, on the concrete slab 38 (mentioned above) instead of an earth or crushed stone foundation 15, which is illustrated in FIG. 1. Otherwise, the FIG. 2 modification is substantially the same as the FIG. 1 showing. And, the method is substantially identical with the method described in connection with the FIG. 1 illustration.

It may be noted that is has been found quite satisfactory to use a single tank full (tank 27) of the fluorinated hydrocarbon when making a test acccording to this invention. A portable sized tank is available in a convenient size for use by refrigerator repairmen.

While a particular embodiment of the invention has been described above in considerable detail in accordance with the applicable statutes, this is not to be taken as in any way limiting the invention but merely as being descriptive thereof.

I claim:

1. Method of detecting leaks in bottom plate of a large storage tank having said bottom plate resting on a foundation, comprising the steps of sealing the periphery of said bottom plate at said foundation against gas leakage, introducing a detectable gas between said bottom plate and said foundation, and scanning said bottom plate with a detector of said gas in order to locate any leaks therein.

2. Method according to claim 1, wherein said step of scanning comprises manually moving said detector over said bottom plate inside said tank.

3. Method according to claim 2, also comprising drilling a hole through said bottom plate, and wherein said step of introducing, comprises feeding said detectable gas through said hole.

4. Method according to claim 3, wherein said detectable gas is a halogen.

5. Method according to claim 4, wherein said halogen gas is a fluorinated hydrocarbon.

6. Method according to claim 5, also comprising installing a union on the inside of said bottom plate, and coupling a supply of said fluorinated hydrocarbon to said union for feeding through said hole.

7. Method according to claim 6, wherein said supply is a pressurized tank of said fluorinated hydrocarbon.

8. Method of detecting leaks in bottom plate of a large storage tank having said bottom plate resting on a foundation, comprising the steps of applying an asphalt seal to the periphery of said bottom plate at said foundation against gas leakage from under said bottom plate at the edges thereof, installing a gas-tight union on the inside of said bottom plate, drilling a hole through said bottom plate inside said union, coupling a pressurized tank of flourinated hydrocarbon to said union for feeding said flourinated hydrocarbon in gaseous form through said hole to the underside of said bottom plate, and scanning the upper side of said bottom plate by manually moving a halogen detector over said bottom plate inside said large storage tank.

* * * * *